(12) United States Patent
Evans et al.

(10) Patent No.: US 10,740,738 B2
(45) Date of Patent: Aug. 11, 2020

(54) SYSTEM AND METHOD FOR COUNTING OBJECTS IN A QUEUE

(71) Applicant: InfraRed Integrated Systems Ltd., Northampton (GB)

(72) Inventors: Chris Evans, Northampton (GB); Stuart Holliday, Northampton (GB)

(73) Assignee: InfraRed Integrated Systems Ltd., Northampton (GB)

( * ) Notice: Subject to any disclaimer, the term of this patent is extended or adjusted under 35 U.S.C. 154(b) by 802 days.

(21) Appl. No.: 13/953,640

(22) Filed: Jul. 29, 2013

(65) Prior Publication Data
US 2015/0032556 A1 Jan. 29, 2015

(51) Int. Cl.
*G06Q 20/20* (2012.01)
*G06K 9/00* (2006.01)

(52) U.S. Cl.
CPC ......... *G06Q 20/20* (2013.01); *G06K 9/00778* (2013.01)

(58) Field of Classification Search
CPC ............................ G06Q 20/20; G06K 9/00778
See application file for complete search history.

(56) References Cited

U.S. PATENT DOCUMENTS

| | | | | |
|---|---|---|---|---|
| 5,581,625 A * | 12/1996 | Connell | ............. | G06K 9/00778 382/100 |
| 6,712,269 B1 | 3/2004 | Watkins | | |
| 7,623,936 B1 * | 11/2009 | Qu | ................... | G05B 19/41865 700/101 |
| 7,652,687 B2 * | 1/2010 | Sorensen | ................. | G07C 9/00 348/150 |
| 7,702,132 B2 | 4/2010 | Crabtree | | |
| 7,778,855 B2 * | 8/2010 | Holliday | .......... | G06Q 10/06315 705/7.31 |
| 8,615,420 B2 * | 12/2013 | Holliday | .......... | G06Q 10/06315 705/7.31 |
| 2005/0104959 A1 | 5/2005 | Han et al. | | |

(Continued)

FOREIGN PATENT DOCUMENTS

| | | |
|---|---|---|
| EP | 1798670 A1 | 6/2007 |
| EP | 3229047 A1 | 10/2017 |

OTHER PUBLICATIONS

Connell, Jonathan, et al. "Retail video analytics: an overview and survey." Video Surveillance and Transportation Imaging Applications. vol. 8663. International Society for Optics and Photonics, 2013.*

(Continued)

*Primary Examiner* — Asfand M Sheikh
(74) *Attorney, Agent, or Firm* — Fredrikson & Byron, P.A.

(57) ABSTRACT

A system for counting objects in a queue waiting for service at one of a plurality of electronic points of service "EPOSs" includes an object tracking system and a processor system for processing data. The processor system may have memory means storing data indicative of the positions of each of said EPOSs within a service point area, and be adapted to receive data from each EPOS indicating its operational status and to receive from said tracking system data relating to positions of objects within the service point area. The method of counting objects in a queue comprises firstly determining an initial seed location as a point at which a single queue of objects forms. Then, determining a new seed location as a point at which the single queue forms Once the new seed location is determined, tracked objects may be assigned to the single queue and then counted.

19 Claims, 5 Drawing Sheets

(56) References Cited

U.S. PATENT DOCUMENTS

| | | | |
|---|---|---|---|
| 2008/0067244 A1 | 3/2008 | Marks | |
| 2009/0097706 A1* | 4/2009 | Crabtree | G06K 9/00771 |
| | | | 382/103 |
| 2010/0235004 A1 | 9/2010 | Thind | |
| 2010/0299116 A1 | 11/2010 | Tomastik et al. | |
| 2011/0213588 A1 | 9/2011 | Lin et al. | |
| 2012/0281094 A1* | 11/2012 | Forshaw | G07C 11/00 |
| | | | 348/150 |
| 2012/0310376 A1 | 12/2012 | Krumm et al. | |
| 2014/0107846 A1 | 4/2014 | Li | |
| 2017/0316262 A1 | 11/2017 | Holliday et al. | |

OTHER PUBLICATIONS

Senior, Andrew W., et al. "Video analytics for retail." 2007 IEEE Conference on Advanced Video and Signal Based Surveillance. IEEE, 2007.*

Extended Search Report for EP Application No. 14178914.9, Jul. 3, 2015, 6 pages.

Antunes, D., "Multi-sensor Based Localization and Tracking for Intelligent Environments," Dissertation to Obtain the Master Degree in Informatics and Computer Engineering, Technical University of Lisbon, Oct. 2011, 88 pgs.

Basalamah, A., "Sensing the Crowds Using Bluetooth Low Energy Tags," IEEE Access, 4:4225-4233, Aug. 2016.

International Search Report and the Written Opinion of the ISA/EP in PCT/EP2019/066525 dated Sep. 23, 2019, 14 pgs.

Texas Instruments, "Introduction to the Time-of-Flight (ToF) System Design," Users Guide, Literature No. SBAU219D, May 2014, 32 pgs.

Texas Instruments, "Time-of-Flight Camera an Introduction," Technical White Paper, Literature No. SLOA190B, May 2014, 10 pgs.

Yamamiya et al., "Using Infrared-Transparent Pigments to Identify Objects," Systems and Computers in Japan, 33(10):74-82, Sep. 2002.

* cited by examiner

SYSTEM AND METHOD FOR COUNTING OBJECTS IN A QUEUE

FIELD OF THE INVENTION

The invention relates to a system and method for counting objects in a queue and more particularly, but not exclusively, to counting people or vehicles waiting in a single queue for service at one of a plurality of electronic points of service "EPOSs" in a service point area.

BACKGROUND OF THE INVENTION

It is well known that people dislike queuing. Extensive research has shown that queuing at an electronic point of service such as a checkout in a retail outlet is one of the main causes of customer dissatisfaction with the service offered. Conversely, short queues and, perhaps more critically, the expectation of short queues, are key ways to build customer loyalty and satisfaction.

The retail outlet experience is repeated across other business sectors. From banks to theme parks, reducing queuing and making more effective use of service point staff and customer service representatives is a business imperative.

Whilst some existing queue learning algorithms are adapted to learn a queue path through a service point area, a major problem encountered is of discriminating between customers waiting to be served and those already in transaction. U.S. Pat. No. 7,702,132 discloses a system which determines queue lengths by associating a first customer to a 'seed' location located at an electronic point of service and iteratively joining customers who exhibit queue-like behavior to the back of the queue thus formed. This system creates a separate queue for each electronic point of service and is thus not readily applicable to situations where multiple service locations may be fed from a single queue line.

OBJECTS OF THE INVENTION

An object of the invention is to mitigate or obviate to some degree one or more problems associated with known queue counting systems and methods.

The above object is met by the combination of features of the main claims; the sub-claims disclose further advantageous embodiments of the invention.

Another object of the invention is to provide an improved method of counting objects such as people or vehicles in a single queue waiting for service at one of a plurality of points of service within a service point area.

One skilled in the art will derive from the following description other objects of the invention. Therefore, the foregoing statements of object are not exhaustive and serve merely to illustrate some of the many objects of the present invention.

SUMMARY OF THE INVENTION

In outline, the proposed solution to the foregoing objects of the invention is to determine an initial seed location as a point in a service point area where a single queue would start if all electronic points of service "EPOSs" were operational, i.e. open for service. Then, by using the EPOSs' locations within the service point area and their actual operational statuses, i.e. state information, a determination can be made of where the queue line actually starts and a count taken of only those objects (people or vehicles) waiting in the queue to be served, but not including those already being served, i.e. not including those already in transaction.

In a first main aspect, the invention provides a system for counting objects in a queue, said system comprising: a plurality of electronic points of service "EPOSs"; an object tracking system for tracking positions of objects within a service point area associated with said plurality of EPOSs; a processor system for processing data, said processor system having memory means storing data indicative of the positions of each of said EPOSs within the service point area, and being adapted to receive data from each EPOS indicating its operational status and to receive from said tracking system data relating to positions of objects within the service point area, said processor system being arranged to perform the steps of: determining from the positions of the plurality of EPOSs within the service point area an initial seed location as a point at which a single queue of objects forms if all of the EPOSs are in operation being fed by said single queue; determining from the actual operational statuses of said plurality of EPOSs a new seed location as a point at which the single queue forms, said new seed location being a point in the service point area prior to or adjacent to an operational, i.e. open, EPOS that is a nearest one of the plurality of EPOSs to the initial seed location; assigning tracked objects within the service point area to the single queue dependent on their positional behavior being determined to exhibit queuing behavior within the service point area; and counting the number of assigned objects in the queue.

The processor system is preferably arranged not to assign an object to the queue where such object is determined as being located at an operational EPOS. For example, a person already being serviced at an EPOS is not considered as being in the queue.

An initial seed location may be determined by assigning a static position within the service point area as the initial seed location and storing data indicative of said static seed location within the memory means of the processor system. Alternatively and preferably, the initial seed location may be determined by processing historical data of object queuing behavior within the service point area and determining a likely initial seed location from such historical data.

Preferably, the processor system is arranged to determine a new seed location when an operational status of an EPOS changes.

The processor system may be arranged to determine a new seed location by performing the steps of: sorting the plurality of EPOSs into an ordered set by distance from the initial seed location with the nearest one of the plurality of EPOSs to the initial seed location being first in order; processing each of the ordered set of EPOSs in turn to determine from its operational status whether or not it is the first operational EPOS in said ordered set of EPOSs; and once a first operational EPOS in said ordered set of EPOSs is determined, assigning a position in the service point area prior to or adjacent to said first operational EPOS as the new seed location for the queue. Once a new seed location is assigned, the processing of said ordered set of EPOSs may be terminated.

In a second main aspect, the invention provides a method of counting objects in a queue in a system comprising a plurality of electronic points of service (EPOSs), an object tracking system for tracking positions of objects within a service point area associated with said plurality of EPOSs, and a processor system for processing data, said processor system having memory means storing data indicative of the positions of each of said EPOSs within the service point area, and being adapted to receive data from each EPOS indicating its operational status and to receive from said tracking system data relating to positions of objects within the service point area, said method comprising the steps of: determining from the positions of the plurality of EPOSs within the service point area an initial seed location as a point at which a single queue of objects forms if all of the EPOSs are in operation being fed by said single queue; determining from the actual operational statuses of said plurality of EPOSs a new seed location as a point at which the single queue forms, said new seed location being a point in the service point area prior to or adjacent to an operational EPOS that is a nearest one of the plurality of EPOSs to the initial seed location; assigning tracked objects within the service point area to the single queue dependent on their positional behavior within the service point area; and counting the number of assigned objects in the queue.

In a third main aspect, the invention provides a computer readable medium comprising program code instructions for causing a processor system when executing the program code instructions to implement the method of the second main aspect of the invention.

In a fourth main aspect, the invention provides a service point area having a system according to the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
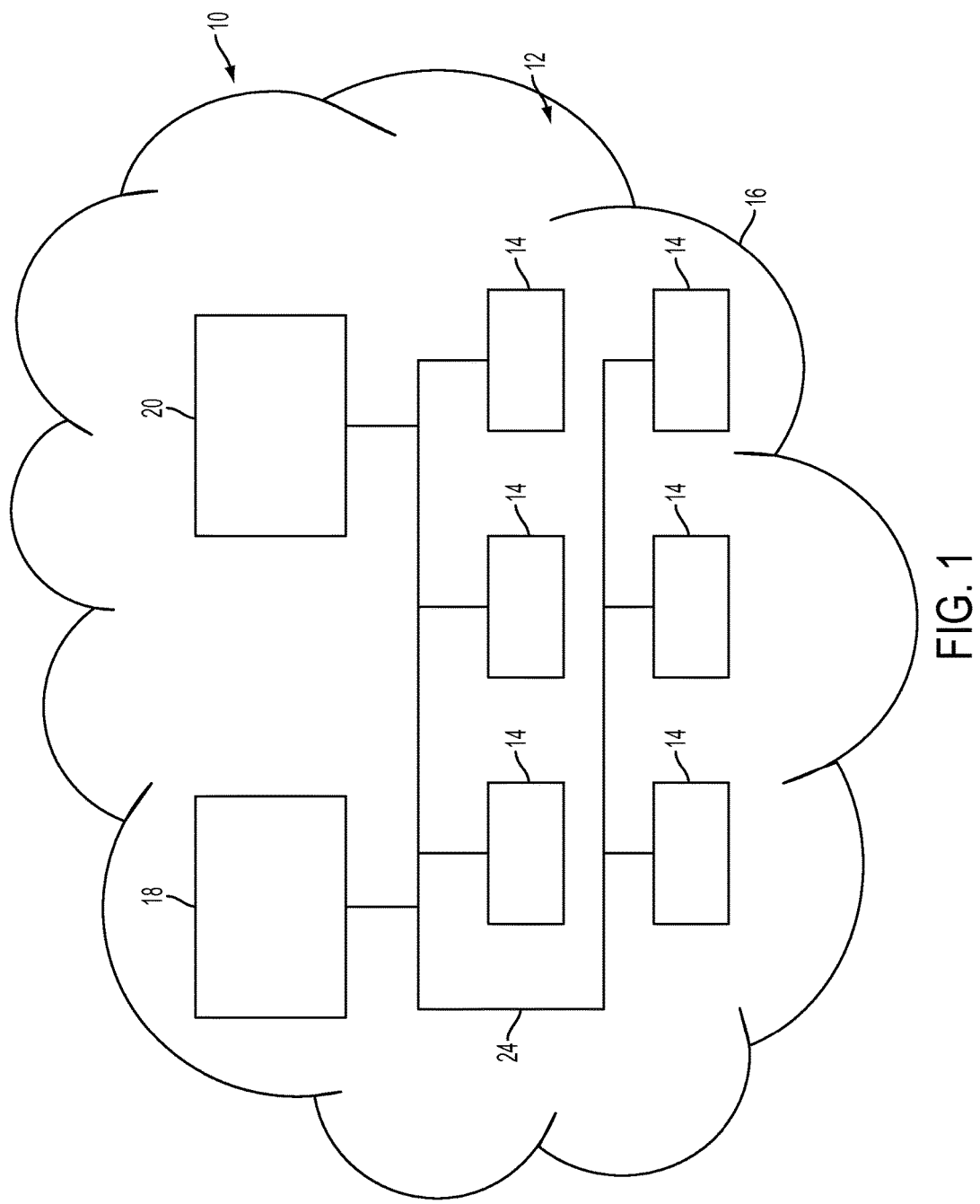
FIG. 1 is a schematic block diagram of a system according to the invention.

Referring to FIG. 1, provided is a schematic block diagram of a system 10 for counting objects in a queue according to the invention. The system 10 comprises a bank of electronic service points "EPOSs" 12 having a plurality of EPOSs 14 arranged within a service point area 16 of a transactional space (not shown) such as a retail outlet, bank, ticket hall, toll charging station or the like, without limitation. In this context, an EPOS 14 comprises any service point, manned or otherwise, where a person, whether on foot or in a vehicle, can conduct an electronic transaction such as paying for goods or services, booking a ticket, obtaining cash from a bank teller machine or the like, without limitation.

The system 10 includes a processor system 18 for processing data and a tracking system 20 for tracking the positions of objects such as people or vehicles within the service point area 16.

The tracking system 20 can comprise any known system for tracking objects in a service point area 16 such as known systems for tracking people in retail environments. Many such systems use video and/or infrared imaging technology to identify people or vehicles as they enter a monitored space and which can not only track the position of an object within said monitored space, but identify other physical parameters of the tracked object to the degree that they can discriminate one tracked object from another. Such tracking systems in conjunction their processor systems may also assign objects to a queue based on the detected behavior of the object in the vicinity of a queue. One such tracking system based on infrared imaging technology is provided by IRISYS™, but known tracking systems of this and other types from other providers can equally be used in the system 10 of the invention.

The processor system 18 has memory means 22 storing data indicative of the positions of each of said EPOSs within the service point area 16. The processor system 18 is adapted to receive data from each EPOS 14 indicating its operational status of open or closed and to receive from said tracking system 20 data relating to positions of tracked objects within the service point area 16. The processor system 18 has stored in its memory means 22 program code instructions which, when executed by the processing system 18, cause the processing system 18 to perform a set of steps leading to a count of objects in a queue within the service point area 16 as will be described more fully below.

The bank of EPOSs 12, the processor system 18 and the tracking system 20 are interconnected for data exchange and communication purposes. The means of interconnection 24 may comprise a computer data cabling system of know type or a communications link or a combination of the two. All that is necessary for the functioning of the system 10 according to the invention is that the component parts 12, 18, 20 of the system 10 are interconnected such that the tracking system 20 can provide at least positional data of objects to the processing system 18 and the EPOSs 14 can provide at least operational status information to the processing system 18.

Figure 2:
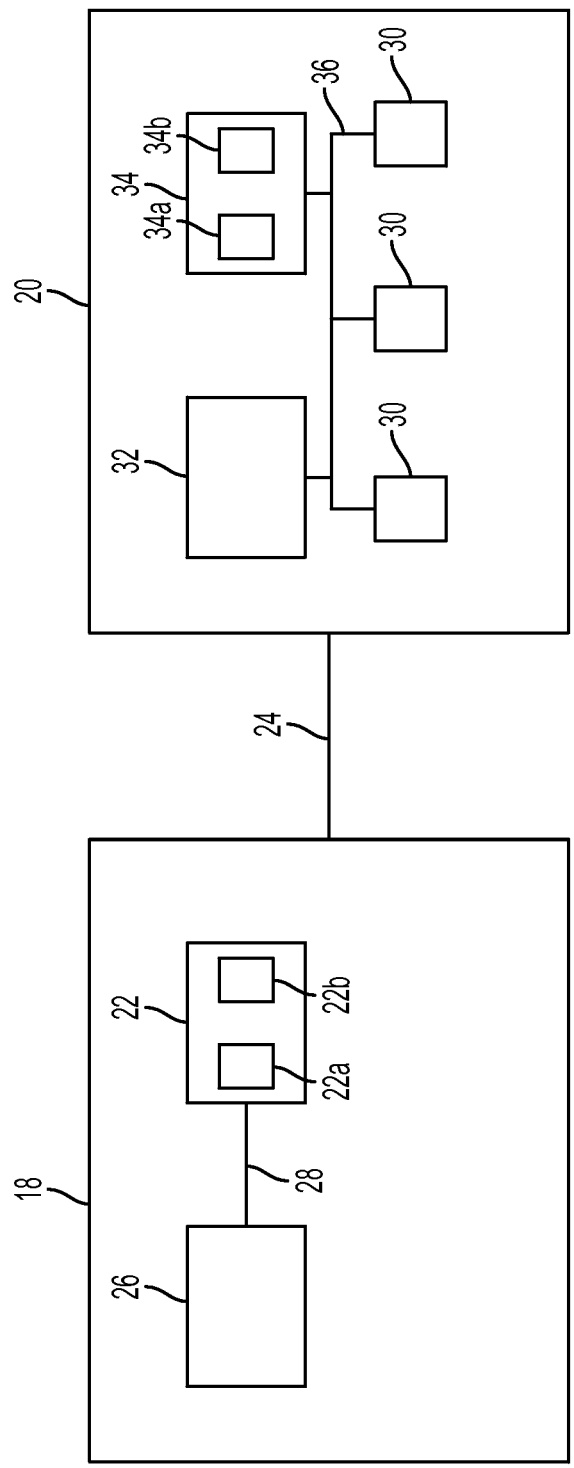
FIG. 2 is a schematic block diagram of the processor system and tracking system according to the invention.

Referring to FIG. 2, shown is a schematic diagram of the processor system 18 and tracking system 20 in more detail. The processor system 18 can be, for example, a general computing system, such as a personal computer, a workstation, or the like. Alternatively, the processor system 18 can be a more specialized device, such as an application-specific processor system, which can use one or more application-specific integrated circuits (ASICs).

The processor system 18 has a processor 26 and a memory component 22. As shown in FIG. 2, the memory component 22 can include one or more types of memory such as a read-only memory (ROM) component 22a and/or a random access memory (RAM) component 22b. The processor system 18 can also include a variety of other components, depending upon the desired functionality of the processor system 18. The processor 26 is in communication with the memory component 22, and can store data in the memory component 22 or retrieve data previously stored in the memory component 22. Data communicated between the processor 26, the memory component 22, or other components of the processor system 18, can be communicated via any suitable data transmission link including a data bus 28 or a communications link.

The tracking system 20 can include several components, such as a sensor or a plurality of sensors 30, a processor 32 and a memory component 34. The sensors 30, which are normally mounted at high vantage points, are arranged so as to have between them a coverage capacity of at least the service point area 16. The processor 32, sensors 30 and memory component 34 can communicate data between components of the tracking system 20 via any suitable data transmission link 36 including a data bus or a communications link which also facilitates data communication between the tracking system 20 and devices external to the tracking system 20.

The sensors 30 can include one or more of a variety of components suitable for collecting tracking information for one or more objects. For example, according to one or more embodiments of the invention, the sensors 30 can include image capture devices, such as video cameras, digital imaging devices, such as charge-coupled display (CCD) cameras, or other suitable image capture devices. Alternatively, according to one or more embodiments of the invention, the sensors 30 can be devices configured to acquire position coordinates for a variety of objects using techniques other than imaging. For example, the sensors 30 can include active tags, such are radio-frequency (RF) emitters or transponder tags, or other devices that provide position and/or trajectory information of an object over time. According to one or more embodiments of the invention, the processor 32 of the tracking system 20 can analyze data sensed by the sensors 30 according to one or more programmed algorithms, which can be stored in the memory component 34. The memory component 34 may include one or more types of memory, such as a ROM component 34a and/or a RAM component 34b. Tracking information obtained via the sensors 30 can be stored locally in a local memory, which can optionally form a part of the tracking system 20, or can be transmitted to the processor system 18.

The processor system 18 is arranged to perform various steps including determining from the positions of the plurality of EPOSs 14 within the service point area 16 an initial seed location as a point at which a single queue of objects forms if all of the EPOSs 14 are in operation being fed by said single queue. Once an initial seed location is determined, the processor system 18 determines from the actual operational statuses of said plurality of EPOSs 14 a new seed location as a point at which the single queue forms, said new seed location being a point in the service point area 16 prior to or adjacent to an operational EPOS 14 that is a nearest one of the plurality of EPOSs to the initial seed location. Following this, tracked objects within the service point area 16 are assigned to the single queue dependent on their positional behavior within the service point area 16 and then the number of assigned objects in the queue is counted.

The data comprising the counted number of objects in the queue waiting to be served can be used by a management system hosted by the processor system 18 or another system to control the number of EPOSs 14 in service at any one time. For example, where the queue length is seen as growing, the management system can arrange for not currently operating EPOSs 14 to be made operational thereby shortening the queue in time by providing an increased number of operating, i.e. open, EPOSs 14. An EPOS 14 could be any of a retail check-out, a bank teller station, a bank teller machine, a toll booth, a ticket counter, a ticket machine, but is not limited by these examples.

One advantage of the system of the present invention is that it enables the management system to make better use of staff by withdrawing staff from EPOSs when the queue count is low and reallocating such staff to other duties. Another advantage is that the system is reactive to unpredictable customer behavior. For example, queues for service points often form in an ad hoc manner unless external constraints are applied to modify people's behavior. For example, where a service point area contains a plurality of service points (EPOSs), people may sometimes form individual queues at each EPOS or form a single queue feeding all of the EPOSs. Whilst the system of U.S. Pat. No. 7,702,132 can only process a single queue per EPOS, the system of the present invention can process both single queues for individual EPOSs or a single queue for a plurality of EPOSs. Thus, the system of the present invention is adaptable to unpredictable human queuing behavior.

The system of the invention may include additional tracking system means for tracking the ingress and egress of objects into and out of an area housing the service point area 16 whereby tracking data from the additional tracking system can be used with the queue count data to predict future queue lengths and thus provide the management system with time to react to predicted queue length.

The processor system 18 is preferably arranged not to assign an object to the queue where such object is determined as being located at an operational EPOS 14. That is, the system 10 of the invention is concerned with counting objects waiting in a queue to be served, but not those already being served as such latter objects can be considered as having left the queue. By this adaptation, the system of the of present invention removes a major constraint in queue management by providing a system 10 that is not constrained by having to process objects that are already in transaction and thus are not, in fact, still queuing for service.

In one embodiment, an initial seed location is determined by assigning a static position within the service point area 16 as the initial seed location and storing data indicative of said static seed location within the memory means 22 of the processor system 18. In another embodiment, the initial seed location is determined from historical data of object queuing behavior within the service point area 16.

The processor system is arranged to determine a new seed location when an operational status of an EPOS changes.

In one embodiment, the processor system is arranged to determine a new seed location by firstly sorting the plurality of EPOSs 14 into an ordered set by distance from the initial seed location with the nearest one of the plurality of EPOSs 14 to the initial seed location being first in order. In this context, distance may not mean the shortest direct measurement of distance between the initial seed location and an EPOS, but a measure of the length of a customer pathway from the initial seed location to an EPOS. Consequently, the term "nearest distance" should preferably relate to a shortest customer pathway length from the initial seed location to an EPOS 14.

In the case where the initial seed location is determined from historical data and thus its location may drift with time, the ordering of the EPOSs 14 into an ordered set takes on greater importance as any drift in the initial seed location may affect the determination of the order of the ordered set of EPOSs.

Once the order of the ordered set of EPOSs 14 is established, the processing system 18 processes each of EPOSs 14 in the ordered set of EPOSs in turn to determine from its operational status whether or not it is the first operational EPOS 14 in said ordered set of EPOSs, i.e. the first open EPOS 14 in the ordered set of EPOSs. Once a first operational EPOS 14 in said ordered set of EPOSs is determined, a position in the service point area 16 prior to or adjacent to said first operational EPOS 14 is assigned as the new seed location, i.e. the new queue head location. Once a new seed location is assigned, the processing of said ordered set of EPOSs may be terminated.

Figure 3:
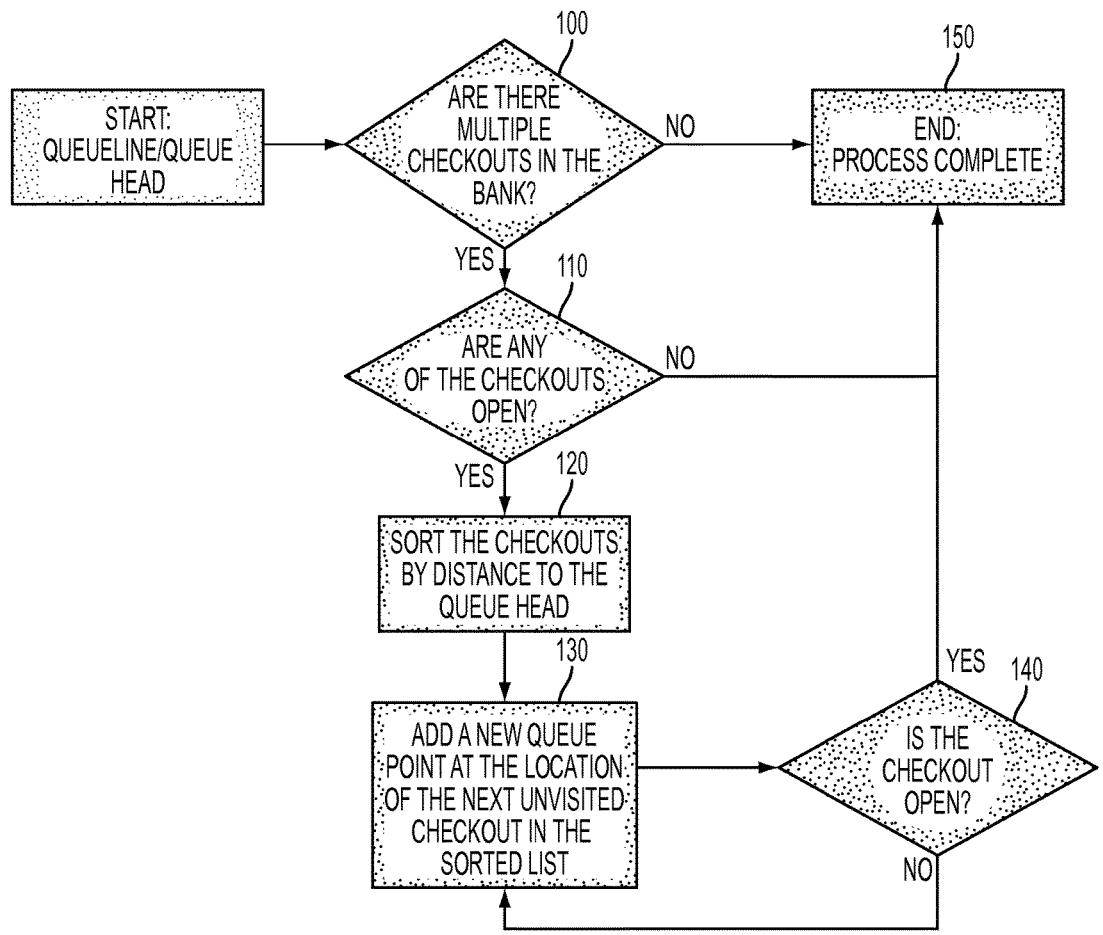
FIG. 3 is a flow diagram of the method according to the invention.

The method of the invention is further illustrated by the flow diagram of FIG. 3 which refers to a bank setting by way of a service point area. In a first step 100, a determination is made as to whether or not there are multiple EPOSs (checkouts) in the bank being fed by a single queue. If the answer is no, the process is terminated at step 150. If the answer is yes, the process moves to step 110 to a determination if any of the checkouts is open. If the answer is no, the process is terminated at step 150. If the answer is yes, the process moves to step 120 to order all of the checkouts being fed by the single queue into an ordered set according to shortest distance from an initial seed location, i.e. an initial queue head. Once the ordered set is complete to enable the checkouts to be processed in turn according to distance from the initial seed location, the process moves to step 130 where a new seed location is set at the location of a next unvisited (not yet processed) checkout. At step 140, a determination is then made as to whether or not the next unvisited checkout is open. If the answer is no then the new seed location is moved to the location of the next succeeding unvisited checkout. This process is repeated as necessary until it is determined at step 140 that the next unvisited checkout is open at which point the current new seed location is confirmed as the new seed location and the process terminates at step 150. It can be seen from the method of FIG. 3 that the 'new' seed location is moved iteratively from the initial seed location until it is set at the location of a first one of the ordered set of EPOSs to be determined as operational, i.e. open for service.

Whilst in the method of FIG. 3 the 'new' seed location is iteratively moved from adjacent one EPOS to another in the ordered set, it will be understood that the 'new' seed location may be moved iteratively from a location prior yet near to each not yet processed EPOS until such time that a next one of the EPOSs is determined to be operational.

Figure 4A:
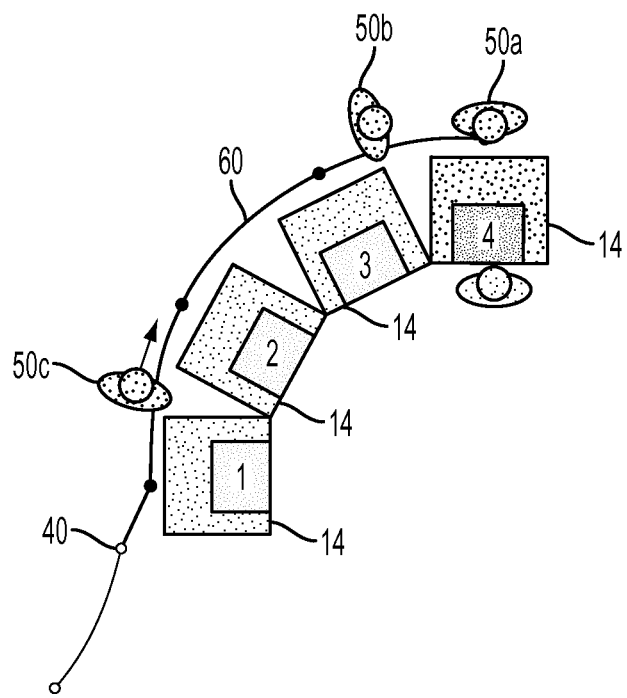
FIGS. 4(a) to (c) depict various service point queuing scenarios according to the invention.
Figure 4B:
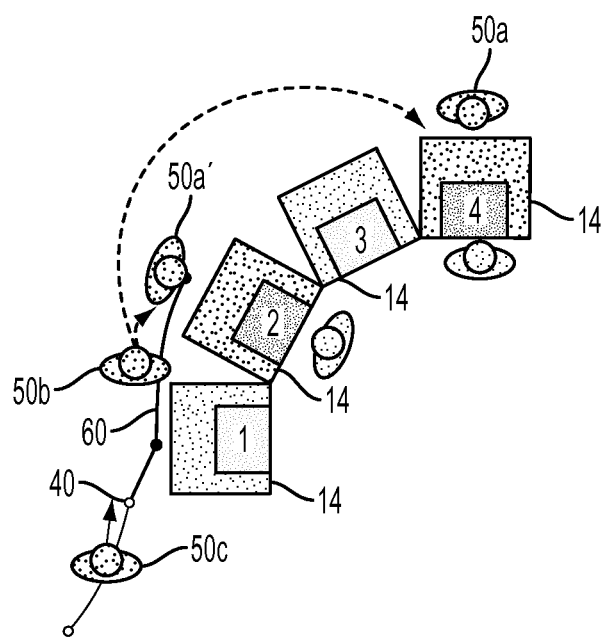
Figure 4C:
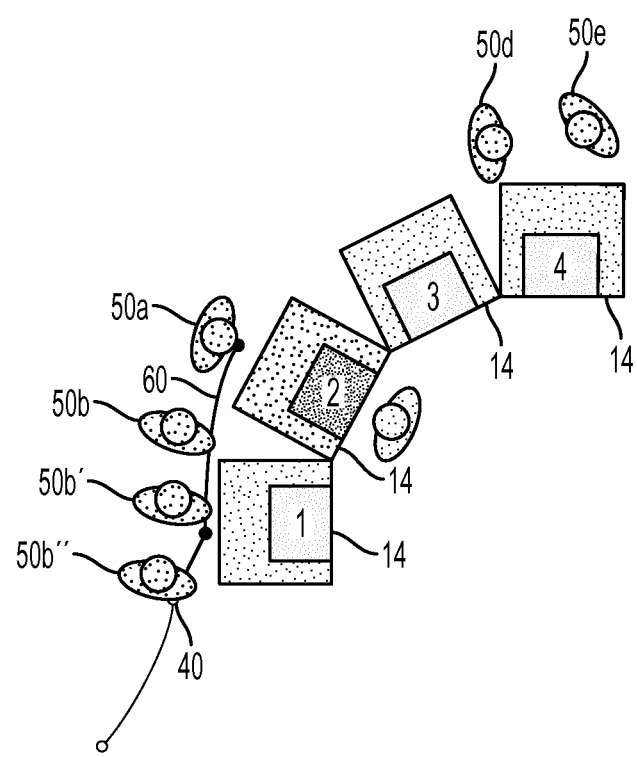

By way of yet further illustrating the implementation of the method of the invention, reference is made to FIGS. 4(a) to (c) which provide different scenarios for queued objects.

In FIG. 4(a), only EPOS no. 4 is open. The processing system 18 sorts the EPOSs 14 by distance to the original queue head 40 and visits each EPOS 14 in turn until it arrives at the first open EPOS which is this case is no. 4. It can be seen here that one customer 50a is in transaction, one 50b is waiting to be served and another 50c is in transit to join the queue 60.

In FIG. 4(b), EPOS nos. 2 and 4 are open. The processing system 18 sorts the checkouts 14 by distance to the original queue head 40 and visits each in turn until it arrives at the first open EPOS which, in this case, is no. 2. Once it reaches EPOS no. 2, the processing system 18 terminates the algorithm. It can be seen that the queue 60 forms behind EPOS no. 2 where the first queuing customer 50b waits until either EPOS nos. 2 or EPOS 4 is available. Two customers 50a, 50a' are in transaction, one customer 50b is waiting to be served and another 50c is in transit to the back of the queue.

In FIG. 4(c), only EPOS no. 2 is open. The processing system 18 sorts the EPOSs 14 by distance to the original queue head 40 and visits each in turn until it arrives at the first open EPOS, i.e. no. 2. Once it reaches EPOS no. 2, the processing system 18 terminates the algorithm. It can be seen that the queue 60 forms behind EPOS no. 2. One customer 50a is in transaction, and three 50b, 50b', 50b" are waiting to be served. The customers 50d, 50e loitering at EPOS no. 4 are determined to not be in transaction nor waiting to be served so the system 10 filters them out completely.

It can be seen that the queue counting solution of the invention determines queue lengths by assigning customers to queue lines, where a queue line is a polyline comprised of one or more straight line segments. The lines are either statically surveyed or learnt over time from customer queuing behaviour. The system exploits spatial service point information and EPOS statuses to augment queue lines for improved line positioning and counting accuracy.

Knowledge of the queue path through a bank of service points allows for a significant improvement in queue counting accuracy. The combination of queueline and EPOS information allows the processing system to accurately determine the number of customers waiting to be served whilst excluding those who are in transaction.

The initial queue head (seed location) is defined as the end node of the queueline which is closest to the EPOSs. The processing system modifies the queue to follow the path through the closed EPOSs, in order of distance, until it reaches the first open EPOS. Consequently, a new queue head point is added iteratively through the ordered set of EPOSs.

In general, the invention provides a system for counting objects in a queue waiting for service at one of a plurality of electronic points of service "EPOSs". The system includes an object tracking system and a processor system for processing data. The processor system may have memory means storing data indicative of the positions of each of said EPOSs within a service point area, and be adapted to receive data from each EPOS indicating its operational status and to receive from said tracking system data relating to positions of objects within the service point area. The method of counting objects in a queue comprises firstly determining from the positions of the plurality of EPOSs an initial seed location as a point at which a single queue of objects forms if all of the EPOSs are in operation being fed by said single queue. Then, determining from the actual operational statuses of said plurality of EPOSs a new seed location as a point at which the single queue forms, said new seed location being a point in the service point area prior to or adjacent to an operational EPOS that is a nearest one to the initial seed location. Once the new seed location is determined, tracked objects may be assigned to the single queue and then counted.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A system for counting objects in a queue, said system comprising:
    a plurality of electronic points of service ("EPOSs"), each of the plurality of EPOSs having an operational status indicating whether the EPOS is open or closed, EPOSs having an operational status indicating the EPOS is open being considered open EPOSs and EPOSs having an operational status indicating the EPOS is closed being considered closed EPOSs;
    an object tracking system comprising one or more sensors for tracking positions of objects within a service point area associated with said plurality of EPOSs;
    a processor system for processing data, said processor system having memory storing data indicative of the positions of each of said EPOSs within the service point area, and being adapted to receive data from each EPOS indicating its operational status, and to receive, from said object tracking system, data relating to positions of objects within the service point area, said processor system being arranged to:
    determine, from the positions of the plurality of EPOSs within the service point area, an initial seed location, the initial seed location being a point at which a single queue of objects forms if all of the EPOSs were open EPOSs and being fed by said single queue;
    receive data from each of the plurality of EPOSs indicating its current operational status;
    determine, from the received data indicating the current operational statuses of said plurality of EPOSs and the data indicative of the positions of each of the EPOSs within the service point area, a new seed location, said new seed location being a point in the service point area prior to or adjacent to an open EPOS that is a nearest open EPOS to the initial seed location;
    receive data from the object tracking system related to positions of objects within the service point area;
    assign tracked objects within the service point area to the single queue based on their positional behavior within the service point area; and
    count a quantity of assigned objects in the single queue.

2. The system of claim 1, wherein the processor system is arranged not to assign an object to the single queue where such object is determined as being located at an open EPOS.

3. The system of claim 1, wherein the processor system is arranged to determine an initial seed location by assigning a static position within the service point area as the initial seed location and storing data indicative of the static position within the memory of the processor system.

4. The system of claim 1, wherein the processor system is arranged to determine an initial seed location by processing historical data of object queuing behavior within the service point area to determine at least one likely initial seed location from the historical data of object queuing behavior.

5. The system of claim 1, wherein the processor system is arranged to determine a new seed location when an operational status of an EPOS changes.

6. The system of claim 1, wherein the processor system is arranged to determine a new seed location by:
    sorting the plurality of EPOSs into an ordered set by distance from the initial seed location with the nearest EPOS of the plurality of EPOSs to the initial seed location being first in order;
    processing each of the ordered set of EPOSs in turn to determine from its operational status whether it is the first open EPOS in said ordered set of EPOSs; and
    upon determining a first open EPOS in said ordered set of EPOSs, assigning a position in the service point area prior to or adjacent to said first open EPOS as the new seed location; and
    terminating processing of said ordered set of EPOSs.

7. The system of claim 6, wherein sorting the plurality of EPOSs into an ordered set by distance from the initial seed location comprising sorting the plurality of EPOSs according to a measure of the length of a customer pathway between the initial seed location and the EPOS.

8. A method of counting objects in a queue in a system comprising a plurality of electronic points of service (EPOSs), an object tracking system for tracking positions of objects within a service point area associated with said plurality of EPOSs, and a processor system for processing data, said processor system having memory storing data indicative of positions of each of said EPOSs within the service point area, and being adapted to receive data from each EPOS indicating its operational status and to receive from said object tracking system data relating to positions of objects within the service point area, said method being performed by the processor system, the operational status of each EPOS indicating whether the EPOS is open or closed, EPOSs having an operational status indicating the EPOS is open being considered open EPOSs and EPOSs having an operational status indicating the EPOS is closed being considered closed EPOSs, said method comprising:
    determining, from the positions of the plurality of EPOSs within the service point area, an initial seed location as a point at which a single queue of objects forms if all of the EPOSs were open EPOSs and being fed by said single queue;
    receiving data from each of the plurality of EPOSs indicating its current operational status;
    determining, from the received data indicating the current operational statuses of said plurality of EPOSs and the data indicative of the positions of each of the EPOSs within the service point area, a new seed location, said new seed location being a point in the service point area prior to or adjacent to an open EPOS that is a nearest open EPOS to the initial seed location;
    receiving data relating to positions of objects within the service point area from the object tracking system;
    assigning tracked objects within the service point area to the single queue based on their positional behavior within the service point area; and counting the number of assigned objects in the single queue.

9. The method of claim 8, wherein assigning objects to the single queue does not include assigning an object to the single queue where such object is determined as being located at an open EPOS.

10. The method of claim 8, wherein determining an initial seed location comprises assigning a static position within the service point area as the initial seed location and storing data indicative of said static position within the memory of the processor system.

11. The method of claim 8, wherein determining an initial seed location comprises the processor system processing historical data of object queuing behavior within the service point area to determine at least one likely initial seed location from the historical data of object queuing behavior.

12. The method of claim 8, wherein the processor system determines a new seed location when an operational status of an EPOS changes.

13. The method of claim 8, wherein the processor system determines a new seed location by:
   sorting the plurality of EPOSs into an ordered set by distance from the initial seed location, with the nearest EPOS of the plurality of EPOSs to the initial seed location being first in order;
   processing each of the ordered set of EPOSs in turn to determine, from its operational status, whether it is the first open EPOS in said ordered set of EPOSs; and
   upon determining a first open EPOS in said ordered set of EPOSs, assigning a position in the service point area prior to or adjacent to said first open EPOS as the new seed location; and
   terminating processing of said ordered set of EPOSs.

14. A non-transitory computer-readable medium comprising executable instructions that, when executed by a programmable processor, causes the programmable processor to perform a method of counting objects in a queue via a system comprising a plurality of electronic points of service (EPOSs), an object tracking system for tracking positions of objects within a service point area associated with said plurality of EPOSs, and a processor system for processing data, said processor system having memory storing data indicative of the positions of each of said EPOSs within the service point area, and being adapted to receive data from each EPOS indicating its operational status and to receive from said object tracking system data relating to positions of objects within the service point area, the operational status of each EPOS indicating whether the EPOS is open or closed, EPOSs having an operational status indicating the EPOS is open being considered open EPOSs and EPOSs having an operational status indicating the EPOS is closed being considered closed EPOSs, said method comprising:
   determining, from the positions of the plurality of EPOSs within the service point area, an initial seed location as a point at which a single queue of objects forms were all of the EPOSs in operation and were being fed by said single queue;
   receiving data from each of the plurality of EPOSs indicating its current operational status;
   determining, from the received data indicating the current operational statuses of said plurality of EPOSs and the data indicative of the positions of each of the EPOSs within the service point area, a new seed location, said new seed location being a point in the service point area prior to or adjacent to an open EPOS that is a nearest open EPOS to the initial seed location;
   receiving from said object tracking system data relating to positions of objects within the service point area;
   assigning tracked objects within the service point area to the single queue based on their positional behavior within the service point area; and
   counting the number of assigned objects in the single queue.

15. The non-transitory computer-readable medium of claim 14, wherein assigning objects to the single queue does not include assigning an object to the single queue where such object is determined as being located at an open EPOS.

16. The non-transitory computer-readable medium of claim 14, wherein determining an initial seed location comprises assigning a static position within the service point area as the initial seed location and storing data indicative of said static position within the memory of the processor system.

17. The non-transitory computer-readable medium of claim 14, wherein determining an initial seed location comprises the processor system processing historical data of object queuing behavior within the service point area to determine at least one likely initial seed location from the historical data of object queuing behavior.

18. The non-transitory computer-readable medium of claim 14, wherein the processor system determines a new seed location when an operational status of an EPOS changes.

19. The non-transitory computer-readable medium of claim 14, wherein the processor system determines a new seed location by:
   sorting the plurality of EPOSs into an ordered set by distance from the initial seed location, with the nearest one of the plurality of EPOSs to the initial seed location being first in order;
   processing each of the ordered set of EPOSs in turn to determine, from its operational status, whether it is the first open EPOS in said ordered set of EPOSs; and
   upon determining a first open EPOS in said ordered set of EPOSs, assigning a position in the service point area prior to or adjacent to said first open EPOS as the new seed location; and
   terminating processing of said ordered set of EPOSs.

\* \* \* \* \*